United States Patent [19]

Ono et al.

[11] Patent Number: 5,448,508
[45] Date of Patent: Sep. 5, 1995

[54] QUASI-MOVING AVERAGE CIRCUIT

[75] Inventors: Mitsuhiro Ono; Toshio Kawasaki, both of Kawasaki, Japan

[73] Assignee: Fujitsu Limited, Kanagawa, Japan

[21] Appl. No.: 60,852

[22] Filed: May 12, 1993

[30] Foreign Application Priority Data

May 12, 1992 [JP] Japan .................... 4-118677

[51] Int. Cl.⁶ .................... G06F 7/38; G06F 7/00
[52] U.S. Cl. .................... 364/734; 364/715.08
[58] Field of Search ............. 364/734, 715.08, 724.08, 364/724.01

[56] References Cited

U.S. PATENT DOCUMENTS 4,789,953  12/1988  Gerrath .................... 364/734
5,068,818  11/1991  Uramoto et al. .................... 364/734

FOREIGN PATENT DOCUMENTS 56-47868  4/1981  Japan .

Primary Examiner—Roy N. Envall, Jr.
Assistant Examiner—Emmanuel Moise

[57] ABSTRACT

A quasi-moving average circuit constituted without use of a conventional shift register, and constituted by a subtracter which subtracts output data at the preceding sampling time from input data at the sampling time at present and outputs subtraction data; an accumulator unit which adds the subtraction data from the aforesaid subtracter and the accumulation data obtained by accumulation by an amount of a predetermined number of times of samplings up to the preceding sampling; and a division means which divides the accumulation data from the aforesaid accumulator unit by N (1/N), thereby outputting an average value of the N sampled values as the output data at the sampling time at present.

10 Claims, 10 Drawing Sheets

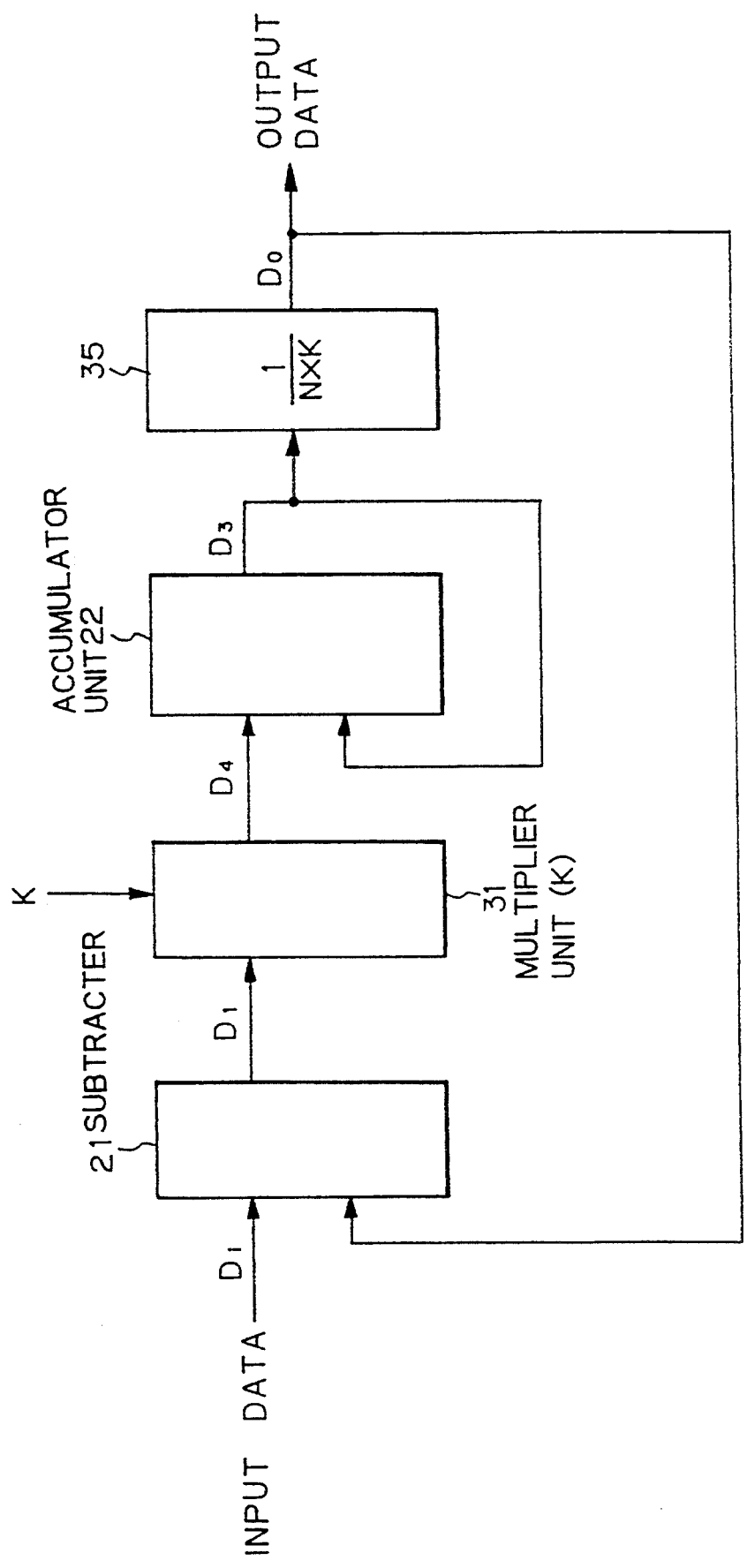

QUASI-MOVING AVERAGE CIRCUIT

BACKGROUND OF THE INVENTION

1. Field of the Invention

The present invention relates to a quasi-moving average circuit, more particularly relates to a circuit for computing a moving average value of data in digital signal processing.

When handling N number of sampling value series, which vigorously change in digital signal processing, to make their profile recognizable, values of bits of a shift register are added at an adder while sequentially shifting the sampling value series by a shift register and then the result is divided by N by a divider, thereby performing moving average computation for averaging for every certain number.

2. Description of the Related Art

As will be explained later with reference to the drawings, a conventional moving average circuit is constituted by a shift register which shifts an input data by N sampling values; a subtracter which subtracts the output data of the shift register from the input data; an accumulator which adds the output data of this subtracter and the data obtained by accumulation of the N times of samplings up to the preceding sampling; and a divider which divides the output data of this accumulator by N to generate output data.

In such a conventional moving average circuit, the above described shift register which stores the input data of the N samplings and further shifts the same is necessary. This shift register is generally constituted by a cascade-connection of N stages of flip-flops. Usually the above described N is selected to for example N=128, and therefore the circuit scale of the shift register becomes large. This is a problem.

SUMMARY OF THE INVENTION

Therefore, an object of the present invention is to provide a quasi-moving average circuit which can be realized without use of a shift register.

To attain the above object, conventionally, the constitution was made so that a signal obtained by delaying N sampled values of input data at the aforesaid shift register was subtracted from the input data sampled at present at the aforesaid subtracter, but the present invention is constituted so that, in place of that signal, that is, the signal obtained by delaying the N sampled values of input data at the aforesaid shift register, an average value (1/N) of the N sampled values of the input data up to the preceding sampling is used, so the aforesaid shift register is made unnecessary.

BRIEF DESCRIPTION OF THE DRAWINGS

The above objects and features of the present invention will be more apparent from the following description of the preferred embodiments with reference to the accompanying drawings, wherein:

FIG. 8 is a diagram showing the basic construction of a second embodiment of the quasi-moving average circuit according to the present invention;

DESCRIPTION OF THE PREFERRED EMBODIMENTS

Before describing the embodiments of the present invention, the prior art and the problems therein will be first described with reference to the related figures.

Figure 1:
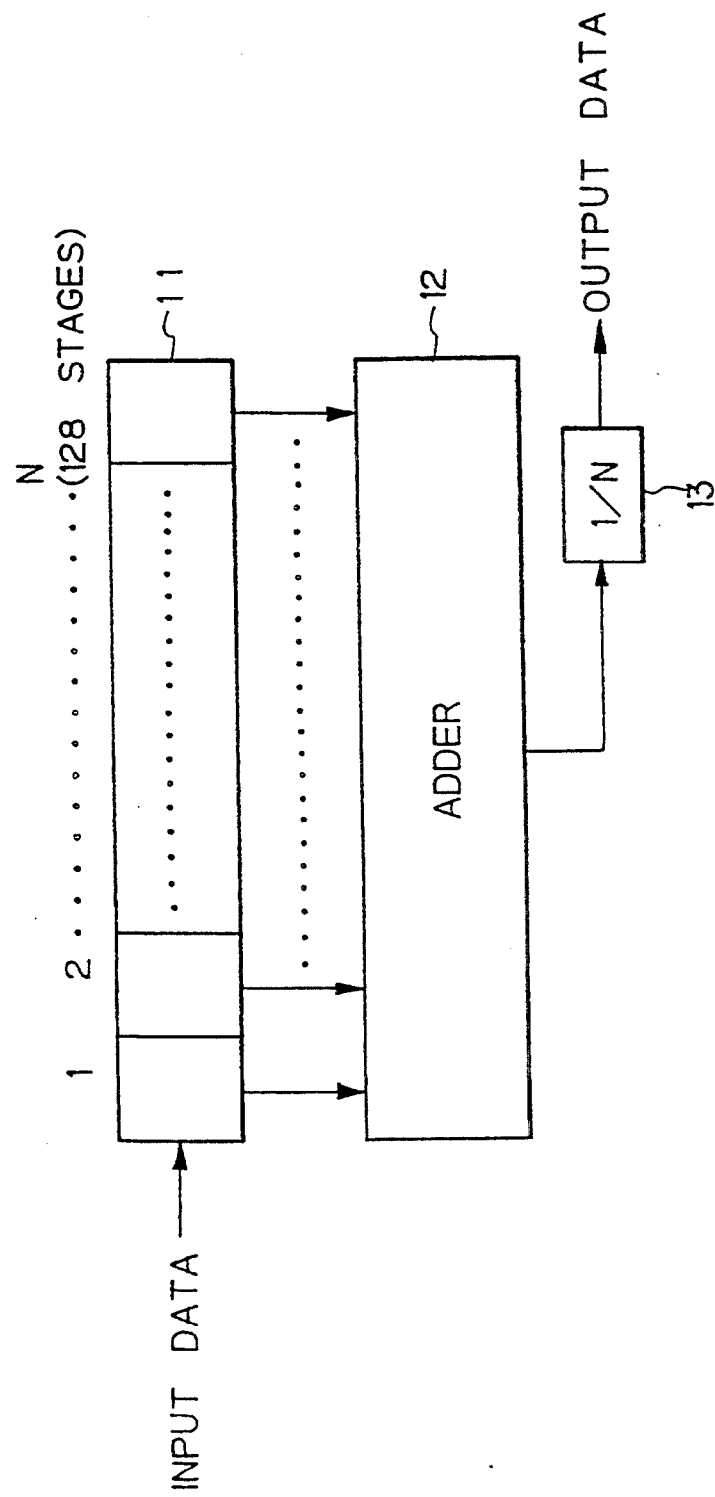
FIG. 1 is a diagram showing the principle of moving average computation.

FIG. 1 is a diagram showing a principle of moving average computation. When handling sampling value series which vigorously change in digital signal processing, to make the profile thereof recognizable, as shown in FIG. 1, values of bits of a shift register 11 are added at an adder 12 while sequentially shifting the sampling value series by the shift register 11 and then the result is divided by N by a divider 13, thereby performing moving average computation for averaging for every certain number.

Figure 2:
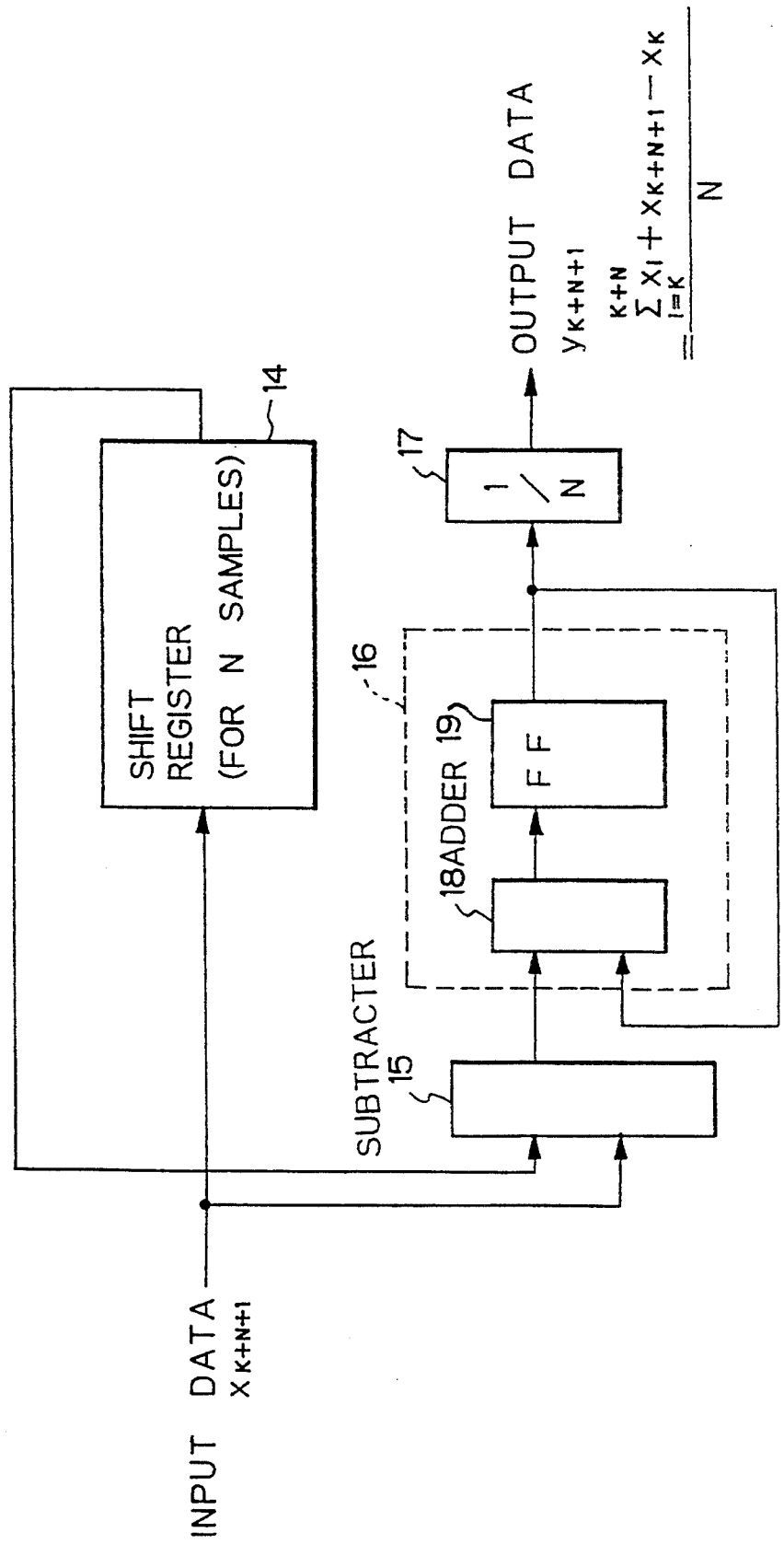
FIG. 2 is a diagram showing an example of a construction of a conventional moving average circuit realizing the moving average computation shown in FIG. 1.

FIG. 2 is a diagram showing an example of a construction of a conventional moving average circuit for realizing the moving average computation shown in FIG. 1. In the present figure, the moving average circuit is constituted by a shift register 14 which shifts input data by the amount of N samplings; a subtracter 15 which subtracts the output data of the shift register 14 from the input data; an accumulator unit 16 which adds the output data of this subtracter 15 and the data obtained by accumulation only by the N times of samplings up to the preceding sampling; and a divider 17 which divides the output data of this accumulator unit 16 by N to generate output data.

In such a conventional moving average circuit, as illustrated, the data $x_k$ of (N+1) samplings in the past is subtracted from the input data $x_{k+N+1}$ (k is a positive integer) by the subtracter 15, thereby finding the data $x_{k+N+1} - x_k$.

Then, a value $\Sigma x_i (i=k, \ldots, k+N)$ obtained by accumulating the data from this subtracter 15 by N sampled values up to the preceding sampling is added at the adder 18. The output data of this adder 18 is delayed by the amount of one sampling at the latch circuit 19 and sent to the adder 18, whereby the next adding is carried out and, at the same time, is sent also to the divider 17 and divided by N by this divider 17, whereby the output data as in the following equation is obtained.

$$y_{k+N+1} = \frac{\sum_{i=k}^{k+N} x_i + x_{k+N+1} - x_k}{N} \quad (1)$$

In the moving average circuit in the conventional example as described above, a shift register 14 having N sampling bits becomes necessary, and there existed the already mentioned problem such that the circuit scale became large.

Accordingly, the present invention proposes a quasi-moving average circuit which does not require a shift register.

Figure 3:
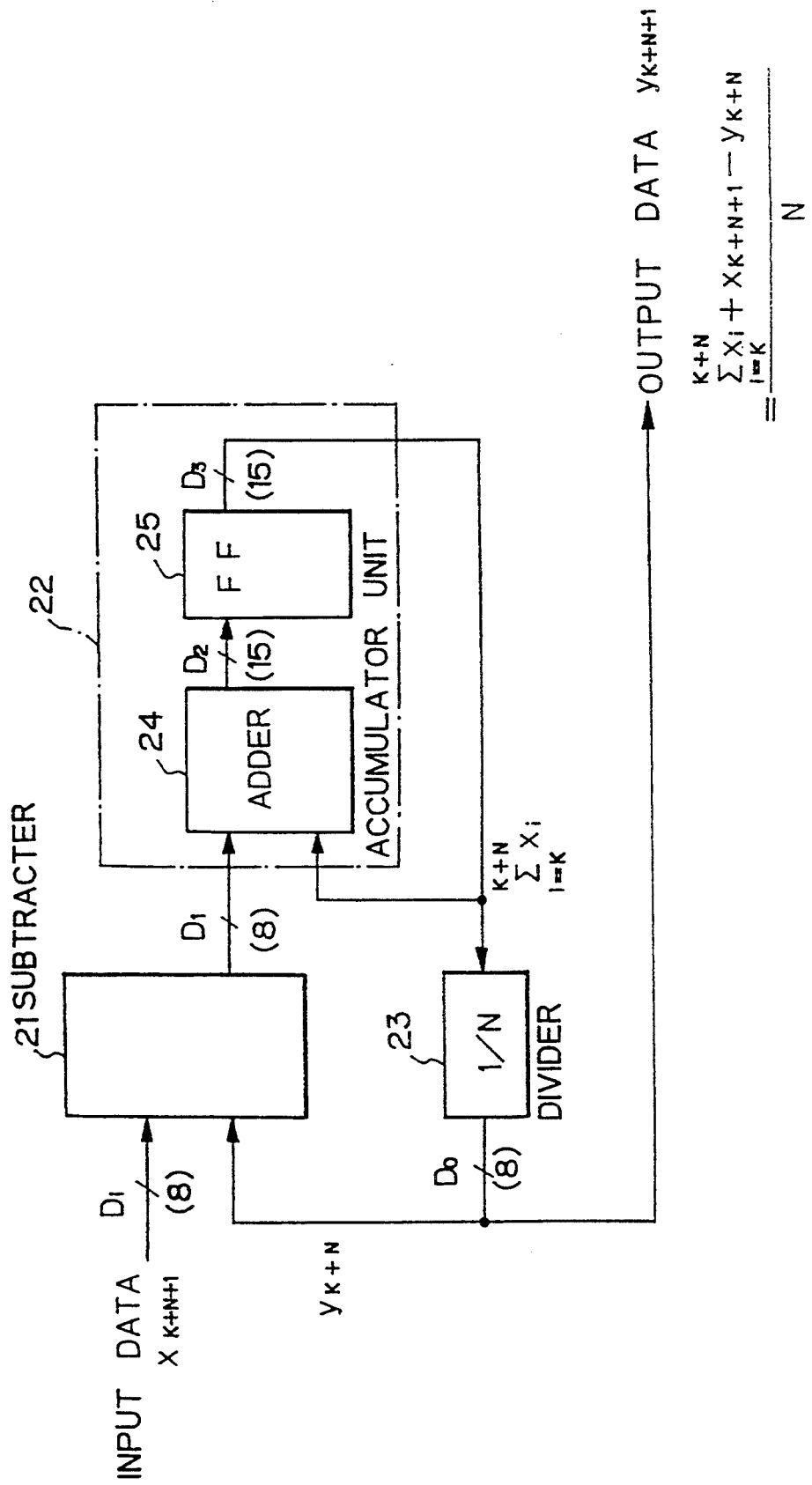
FIG. 3 is a diagram showing the basic construction of a quasi-moving average circuit according to the present invention.

FIG. 3 is a diagram showing the basic construction of the quasi-moving average circuit according to the present invention. As shown in the present figure, the quasi-moving average circuit according to the present invention is comprised of a subtracter 21 which subtracts output data at the preceding sampling time from input data at a present sampling and outputs subtraction data; an accumulator unit 22 which adds the subtraction data from the aforesaid subtracter 21 and accumulation data obtained by accumulating a predetermined number of sampled data up to a preceding sampling; and a division means 23 which divides the accumulation data from the aforesaid accumulator unit 22 by N (1/N), thereby outputting an average value of N sampled values as the output data at the sampling at present.

The aforesaid accumulator unit 22 comprises an adder 24 which adds the aforesaid subtraction data and the aforesaid accumulation data and latch circuits (FF) 25 which delay the output data from the adder 24 by one sampled value.

In the quasi-moving average circuit of the present invention shown in FIG. 3, as illustrated, when assuming that the input data is $x_{k+N+1}$ and the output data is $y_{k+N+1}$ at the same sampling time, the data given from the divider 23 to the subtracter 21 is an output data $y_{k+N}$ at the preceding sampling (this per se has become the moving average value of the N sampled values up to the preceding sampling), and by subtracting the output data at the preceding sampling time from the input data by the subtracter 21, the data $x_{k+N+1} - y_{k+N}$ is output.

The output data from this subtracter 21 is added to the data $\Sigma x_i$ (i=k, ..., k+N) obtained by performing accumulation by the predetermined sampled values up to the preceding sampling, in the accumulator unit 22 (preferably the adder 24 constituting this accumulator unit 22), the output data of this adder 24 is delayed by one sampled value at the latch circuit 25 and given to the accumulator unit 22 for the next addition and, at the same time, given to the division means 23.

Accordingly, the data $y_{k+N+1}$ output from the division means 23 becomes as in the following equation.

$$y_{k+N+1} = \frac{\sum_{i=k}^{k+N} x_i + x_{k+N+1} - y_{k+N}}{N} \quad (2)$$

When comparing the above described equation (2) and equation (1), it is seen that, in equation (1), $x_k$ is subtracted from the input data, and contrary to this, in equation (2) of the present invention, the output data $y_{k+N}$ at the preceding sampling time is subtracted from the input data.

Namely, in the present invention, attention was paid to the fact that the input data $x_k$ of N samplings in the past as shown in equation (1) is approximated to the output data $y_{k+N}$ at the preceding sampling time. This is proved by FIG. 4.

Figure 4:
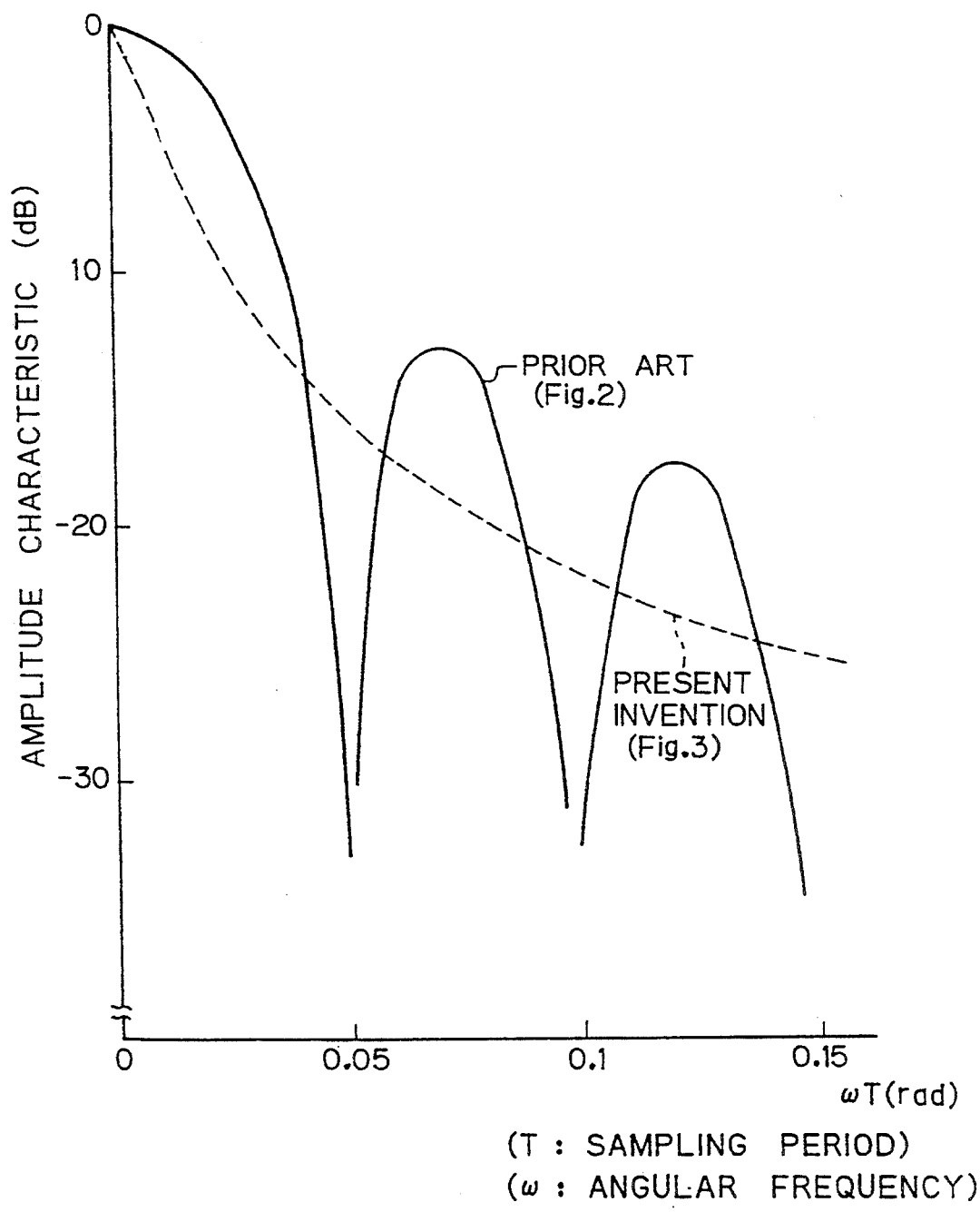
FIG. 4 is a graph for comparing a characteristic obtained by the circuit of FIG. 2 and a characteristic obtained by the circuit of FIG. 3.

FIG. 4 is a graph for comparing the characteristic obtained by the circuit of FIG. 2 with the characteristic obtained by the circuit of FIG. 3, in which a time represented by an angular frequency $\omega \times$ sampling period T is plotted on the abscissa and an amplitude characteristic is plotted on the ordinate. As seen from this characteristic diagram, in the case of the prior art, recesses in the amplitude due to the N sampled values of the shift register are produced, but contrary to this, in the quasi-moving average circuit of the present invention, the moving average value is smoothly converged along with the elapse of time. Originally, the curve (dotted line) obtained in the present invention exhibits an attenuation tendency (the higher the frequency, the larger the attenuation) resembling the curve (solid line) obtained by the prior art. That is, as a whole, similar low-pass filtering characteristics are exhibited. Note that, the generally frequently used term "range" is from $0\omega T$ to 0.05 $\omega T$ ($\omega = 2\pi f$) in the abscissa in FIG. 4.

Figure 5:
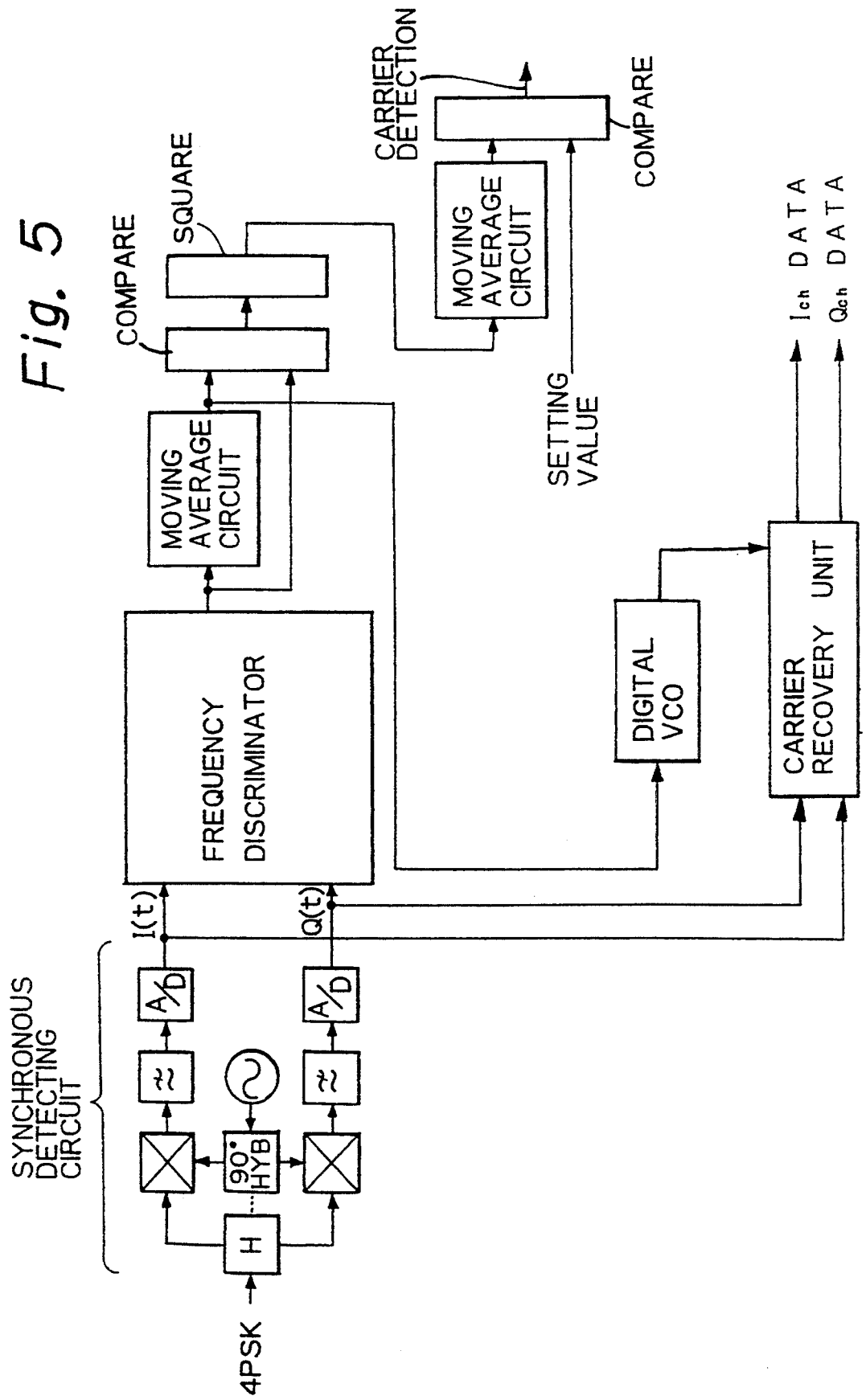
FIG. 5 is a diagram showing one example of an object to which the quasi-moving average circuit according to the present invention is applied.

FIG. 5 is a diagram showing one example of an object to which the quasi-moving average circuit according to the present invention is applied and shows a demodulator serving as part of the process from receiving of a 4 PSK (Phase Shift Keying) signal to reproduction of the original data from this. In this FIG. 5, the quasi-moving average circuit according to the present invention is used first for eliminating the noise component contained in the output from the frequency discriminator when frequency error is produced from the output from the frequency discriminator, and second, used for suppressing the noise component contained in the output from a square circuit when a carrier detecting signal is produced. Note that, the object shown in FIG. 5 is just one example, and the moving average circuit per se is widely utilized even in a field other than the field of communication.

As already mentioned, in the present invention, moving average value computation approximating the case where a shift register is substantially used can be executed without the use of a shift register (14) which enlarges the circuit scale.

Figure 6A:
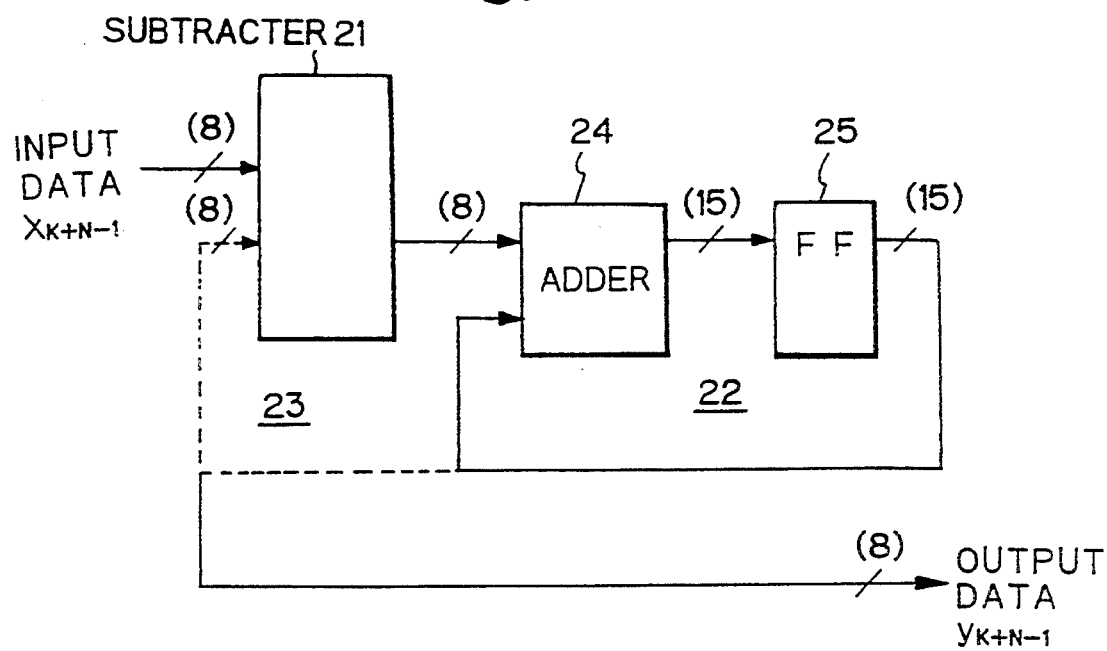
FIGS. 6A and 6B are diagrams showing a first embodiment of the quasi-moving average circuit according to the present invention.
Figure 6B:
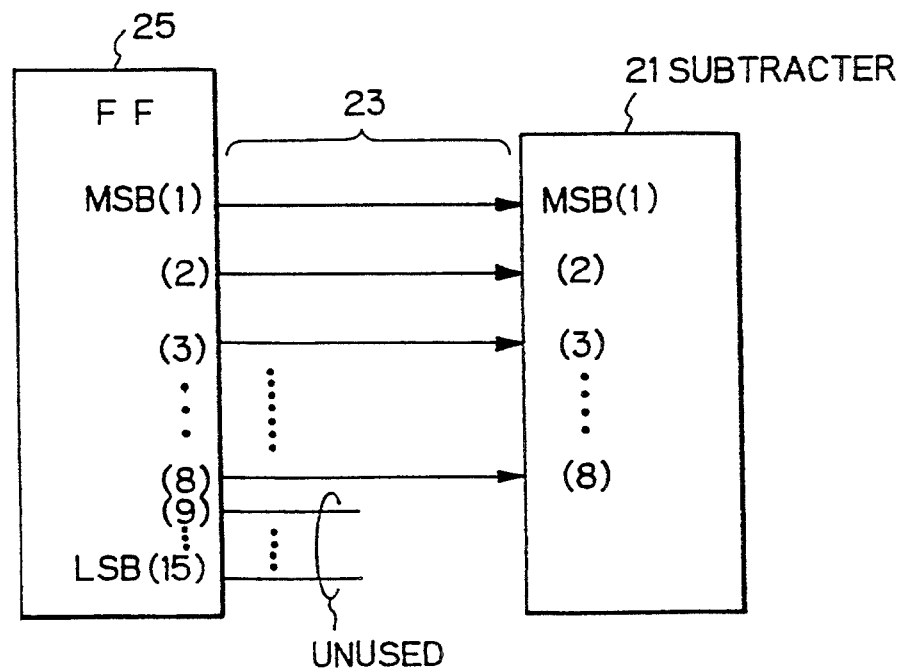

FIGS. 6A and 6B are diagrams showing a first embodiment of a quasi-moving average circuit according to the present invention and particularly diagrams showing a preferable example of the division means 23 shown in FIG. 3. Generally speaking, the aforesaid division means 23 is constituted by extracting only output lines corresponding to a plurality of upper side bits among output lines of the aforesaid latch circuit 25 and connecting the extracted output lines to a subtraction input side of the subtracter 21 in one-to-one correspondence with bits from the upper bit to the lower bit of the aforesaid subtracter 21.

In the first embodiment of FIG. 6A, a moving average length N is set to 128 stages (7 bits worth) and the input data $X_{k+N+1}$ is constituted by 8 bits.

Accordingly, the output data $y_{k+N+1}$ becomes 15 bits as is, but in the division means 23 shown in FIG. 3, the division by N, that is, by 128, is carried out, and therefore, as indicated by the output data $y_{k+N+1}$ in FIG. 6B, it is sufficient if the output data (15 bits) of the latch circuit 25 is shifted by 7 bits to the upper bit side and if 8 bits worth is extracted from an MSP (most significant bit) and input to the subtracter 21. The input data to the subtracter 21 at this time can be used as the output data $y_{k+N-1}$ (8 bit-output data) at the next sampling time.

Data at the units and a bit construction of the data will be concretely explained with reference to FIG. 3 again.

In FIG. 3, the subtracter 21 subtracts the output data $D_0$ at the preceding sampling time from the input data $D_i$ at present and outputs the subtraction data $D_1$.

For example, when the input data $D_i$ consists of 8 bits, the subtraction data $D_1$ becomes 8 bits.

The accumulator unit 22 accumulates the subtraction data $D_1$ by the predetermined number N of samplings (moving average length). It is constituted by an adder 24 which adds the subtraction data $D_1$ and the accumulation data $D_3$ obtained by accumulating the amount of the moving average length N up to the preceding sampling and a latch circuit 25 which delays the output data $D_2$ of this adder 24 by 1 sampled value (mentioned before).

When assuming that the moving average length N is 128 stages (7 bits worth), the accumulation data $D_3$ obtained by the accumulation of the subtraction data $D_1$ of 8 bits at the accumulator unit 22 having 7 bits of moving average length becomes 15 bits.

Namely, the accumulation data $D_3$ which is to be fed back from the latch circuit 25 to the adder 24 is all fed back to the adder 24.

Moreover, the accumulation data $D_3$ is fed back also to the subtracter 21, but in this case, as shown in the division means 23, it is divided by N ($N=2^n$: $n=1, 2, \ldots$, and has the same value as the moving average length) and then fed back. This data to be fed back is also the output data $D_0$.

That is, here, 15 bits of accumulation data $D_3$ is divided by $2^7$ (7 bits worth) and fed back.

This is actually realized by the connection of the output ends of the latch circuit 25 with the input ends of the subtracter 21 so that 15 bits of accumulation data $D_3$ is shifted by 7 bits in the downward direction and fed back (refer to FIG. 6B).

For example, where it is assumed that the accumulator unit 22 has 20 bits, the output ends of the latch circuit 25 are (first bit) to $2^{19}$ (20th bit), but the accumulation data $D_3$ consists of 15 bits as described before, and therefore the accumulation data $D_3$ is output from $2^0$ (first bit) to $2^{14}$ (15th bit) output ends of the latch circuit 25.

In the input ends of the subtracter 21, the MSB (most significant bit) is the 8th bit, and therefore the construction is made so that the output end of the 15th bit of the latch circuit 25 is connected to the input end of 8th bit of the subtraction 21; the output end of the 14th bit of the latch circuit 25 is connected to the input end of the 7th bit of the subtracter 21; ... ; and the output end of the 8th bit of the latch circuit 25 is connected to the input end of first bit of the subtracter 21.

In the above-mentioned moving average circuit of the first embodiment, the connection between the output ends of the latch circuit 25 of the accumulator unit 22 and the input ends of the subtracter 21 is fixed relying on the constant moving average length N (FIG. 6B), and therefore where the moving average length N is changed, also the connections between the two must be modified, with the result that the modification of the moving average length N cannot be easily carried out.

For example, where the moving average length of 128 in the above-mentioned circuit construction is 256 (8 bits worth), the accumulation data $D_3$ becomes 16 bits, and therefore so as to multiply this by $1/2^8$ and obtain the 8 bits of output data $D_0$, the wirings between the output ends of the latch circuit 25 and the input ends of the subtracter 21 must be modified so that 16 bits of accumulation data $D_3$ are shifted by 8 bits in the downward direction and fed back.

Namely, it is necessary that the output end of the 16th bit of the latch circuit 25 be connected to the input end of the 8th bit of the subtracter 21, ..., and the output end of the 9th bit of the latch circuit 25 be connected to the input end of the first bit of the subtracter 21.

Figure 7A:
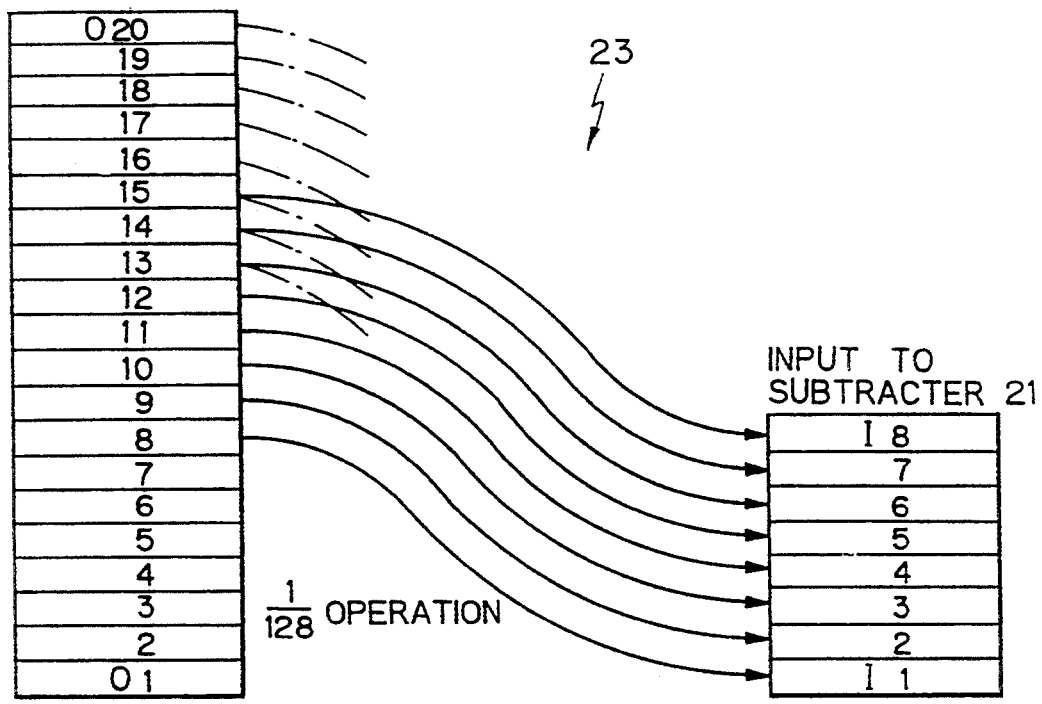
FIG. 7A is a view diagrammatically showing wirings where a moving average length is set to 128.
Figure 7B:
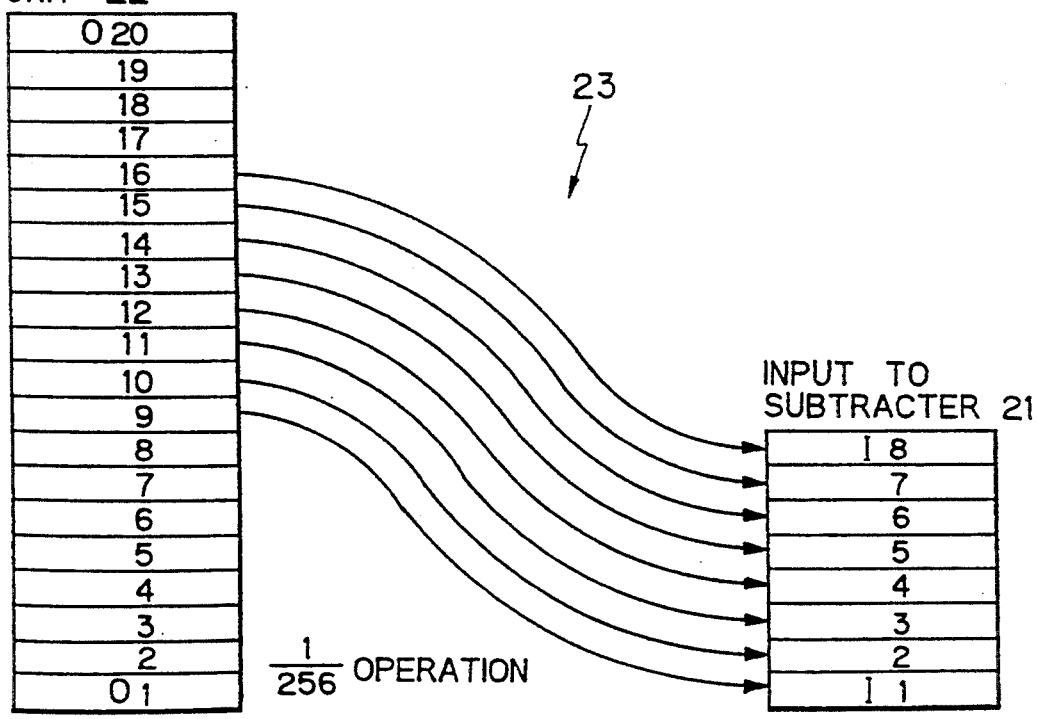
FIG. 7B is a view diagrammatically showing wirings where the quasi-moving average length is set to 256.

FIG. 7A is a view diagrammatically showing the wirings where the moving average length is set to 128; and FIG. 7B is a view diagrammatically showing the wirings where the moving average length is set to 256. In FIG. 7A, when it is assumed that the input data consists of 8 bits when the moving average length is 128 (7 bits worth), the output of the accumulator unit 22 becomes $O_1$ to $O_{15}$, the 1/128-operation is carried out for this, and the resultant signal is given to the input of the subtracter 21. Also, in FIG. 7B, when it is assumed that the input data consists of 8 bits when the moving average length is 256 (8 bits worth), the output of the accumulator unit 22 becomes $O_1$ to $O_{16}$, a 1/256-operation is carried out for this, and the resultant signal is given to the input of the subtracter 21.

As apparent from a comparison between FIG. 7A and FIG. 7B, when the moving average length is modified, the wirings (23) between the accumulator unit 22 and the subtracter unit 21 are significantly changed in connection configuration. The moving average length is changed as described above because for example the desired low-pass filtering characteristic differs according to users. It is required that flexible modification of connection configuration in accordance with the demand of the user be possible. In the first embodiment, however, a demand that the moving average length N should be variable cannot be easily satisfied. One satisfying this is a second embodiment of the present invention mentioned next.

FIG. 8 is a diagram showing the basic construction of the second embodiment of the quasi-moving average circuit according to the present invention. In FIG. 8, 21 is the aforesaid subtracter, which subtracts the output data $D_0$ at the preceding sampling time from the input data $D_i$ at present.

Reference numeral 31 is a multiplier unit, which multiplies the data $D_1$ output from the subtracter 21 by an arbitrarily set multiplier K. This is one of the characteristic features of the second embodiment.

Reference numeral 22 is the aforesaid accumulator unit, which adds the data $D_4$ output from the multiplier unit 31 and the data obtained by performing the accumulation only by the amount of predetermined number N of samplings up to the preceding sampling.

The constitution is made so that the accumulator unit 22 and the subtracter 21 are connected so that the data $D_3$ output from the accumulator unit 22 becomes the same as the value obtained by dividing the data $D_3$ by the value (1/N×K) prepared by multiplying the number N of samplings by the multiplier K and is fed back to the subtracter 21 and, at the same time, the data fed back from the accumulator unit 22 to the subtracter 21 by this connection becomes the output data $D_0$ at present.

Also, preferably the constitution is made so that the multiplier K is determined so that $2^D \times 2^m \times 2^n = 2^P$ stands when the number N of samplings is modified where the output end of the most significant bit of the accumulator unit 22 and the input end of the most significant bit of the subtracter 21 are connected; the output ends shifted by each one bit to the lower side from the most significant bit of the accumulator unit 22 and the input ends shifted by each one bit to the lower side from the most significant bit of the subtracter 21 are connected up to the least significant bit of the subtracter 1, and the number of bits of input data $D_i$ is represented by a binary number $2^D$ ($D=1, 2, \ldots$); the multiplier K is represented by $2^m$ ($m=1, 2, \ldots$); the number N of samplings is represented by $2^n$ ($n=1, 2, \ldots$); and the number of the most significant bits of the accumulator unit 22 is represented by a binary number $2^P$ ($P=1, 2, \ldots$).

In the end, in the second embodiment, between the aforesaid subtracter 21 (FIG. 3) and the subtraction data input unit of the aforesaid accumulator unit 22, a multiplier unit 31 which multiplies the predetermined multiplier K (K is an integer of 2 or more) with the subtraction data is inserted, only the output lines corresponding to a plurality of upper significant bits among the output lines of the aforesaid latch circuits 25 are extracted, and the extracted output lines are connected in one-to-one correspondence with respective bits from the upper bit to the lower bit on the subtraction input side of the aforesaid subtracter 21, thereby constituting the division means 35, and thus the division means 35 outputs the average value of the N sampled values as the output data at the sampling time at present by dividing the accumulation data from the aforesaid accumulator unit 22 by N×K (1/(N×K)). Also, the number of times N of the aforesaid sampling is made variable and the value of the aforesaid multiplier K is set in accordance with the variable N. In this case, the value of the aforesaid multiplier K is set corresponding to the aforesaid variable N so as to satisfy $2^D \times 2^m \times 2^n = 2^P$ when the number of bits of the aforesaid input data $D_i$ is represented by the binary number $2^D$ ($D=1, 2, \ldots$); the aforesaid multiplier K is represented by the binary number $2^m$ ($m=1, 2, \ldots$); and the aforesaid number N of samplings is represented by the binary number $2^n$ ($n=1, 2, \ldots$).

According to the above-mentioned second embodiment of the present invention, the data fed back from the accumulator unit 22 to the subtracter 21 becomes the same as the value obtained by dividing the data $D_3$ output from the accumulator unit 22 by the value prepared by multiplying the sampling number N and the multiplier K, and fed back to the subtracter 21 and, at the same time, becomes the output data $D_0$.

Also, it is sufficient if the multiplier K is merely modified so that $2^D \times 2^m \times 2^n = 2^P$ stands where the number N of samplings is modified, that is, so that the data $D_3$ output from the accumulator unit 22 always becomes the identical bit as the most significant bit of the accumulator unit 22, and therefore it becomes unnecessary to modify the connection configuration between the accumulator unit 22 and the subtracter unit 21 as shown in FIGS. 7A and 7B.

Figure 9:
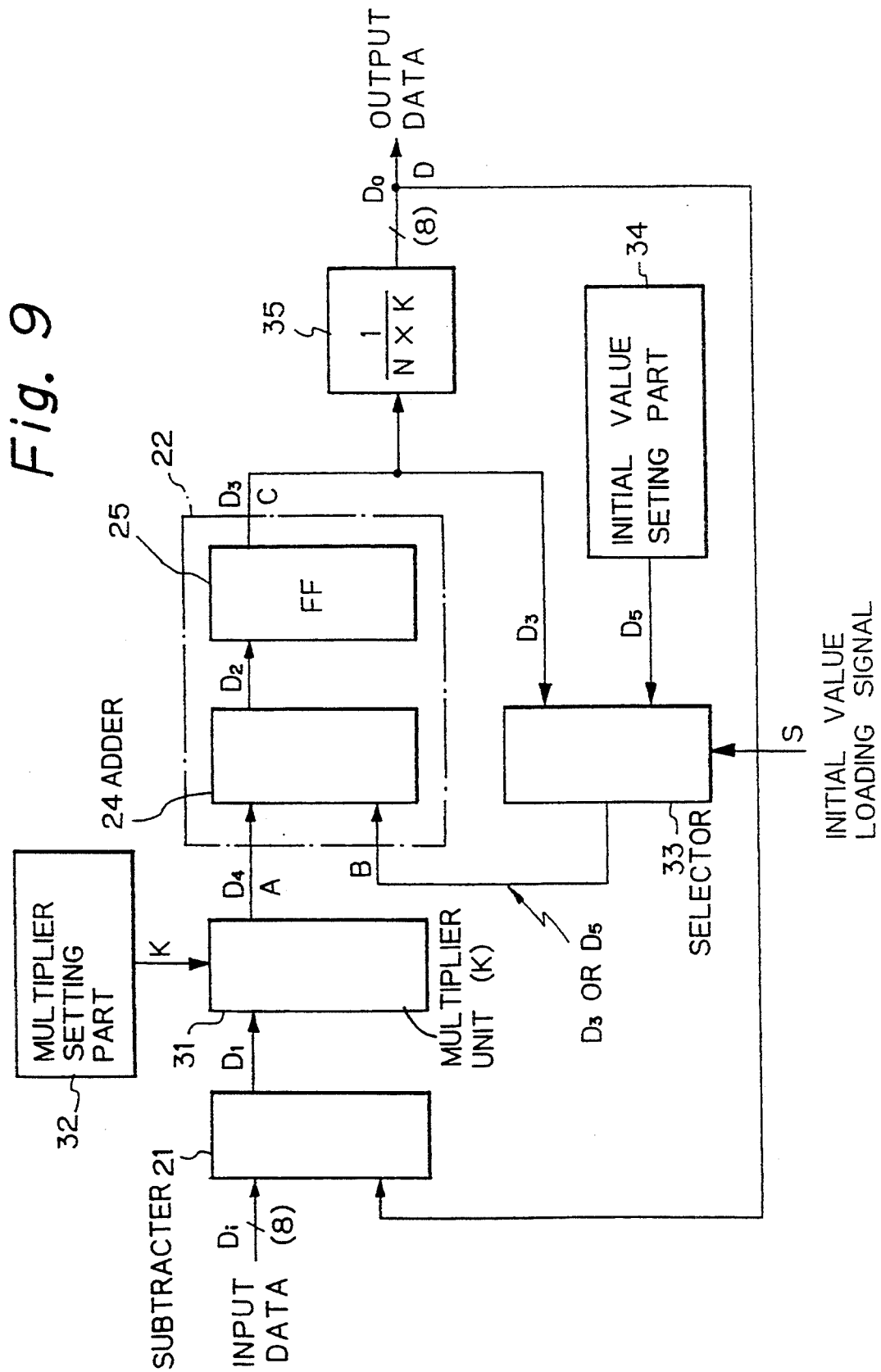
FIG. 9 is a diagram further concretely representing the second embodiment according to the present invention.

FIG. 9 is a diagram further concretely expressing the second embodiment according to the present invention. Note that, the same constituent elements are given the same reference numerals or symbols throughout all the diagrams. Also, according to this quasi-moving average circuit shown in FIG. 9, also a certain inconvenient point produced by the circuit of the first embodiment is eliminated. This inconvenient point is that a long time is required until the output data $D_0$ of FIG. 3 settles to a stable value.

For example, in an initial state such as when turning on the power source, a long time is sometimes taken until the output data $D_0$ becomes a stable value according to a certain value of the accumulation data $D_3$ output from the accumulator unit 22.

Accordingly, if the circuit of FIG. 9 is used, the modification of the moving average length N can be easily carried out and the time from the initial state to when a stable output data is obtained can be made short.

In FIG. 9, 31 is the aforesaid multiplier unit, which multiplies the subtraction data $D_1$ output from the subtracter 21 by K and outputs the multiplied data $D_4$. Also, the multiplier K of the multiplier unit 31 can be arbitrarily changed by the multiplier setting part 32. Note, K is made equal to $2^m$: $m=1, 2, \ldots$.

Reference numeral 33 is a selector, which selects either of the accumulation data $D_3$ output from the latch circuit 25 of the accumulator unit 22 or the initial value $D_5$ arbitrarily set at the initial value setting part 34 and outputs the same to the adder 24 of the accumulator unit 22. Where the initial value loading signal S is fed to the selector 33, the initial value $D_5$ is selected.

All of the accumulation data $D_3$ consisting of X bits output from the latch circuit 25, that is, X bits are fed back via the selector 33 to the adder 24.

Further, the accumulation data $D_3$ is fed back also to the subtracter 21, but in this case, as shown in the division means 35, it is divided by (N×K) (N=$2^n$: $n=1, 2, \ldots$, and the same value as the moving average length and K is the same value as the multiplier K), and fed back. This data to be fed back is also the output data $D_0$.

This is realized by having the output end of the MSB of the latch circuit 25 connected to the input end of MSB of the subtracter 21, and below, the output ends going downward by each one bit from the MSB of the latch circuit 25 and the input ends going downward by each one bit from the MSB of the subtracter 21 being connected.

For example, where it is assumed that the accumulator unit 22 has 20 bits, the output ends of the latch circuit 25 are $2^0$ (first bit) to $2^{19}$ (20th bit: MSB).

When assuming that the subtracter 21 deals with the 8 bits of input data $D_i$, the MSB of the input ends of the subtracter 21 is the 8th bit, and therefore the constitution is made so that the output end of the 20th bit of the latch circuit 25 is connected to the input end of the 8th bit of the subtracter 21; the output end of the 19-th bit of the latch circuit 25 is connected to the input end of the seventh bit of the subtracter 21; ...; and the output end of the 13th bit of the latch circuit 25 is connected to the input end of the first bit of the subtracter 21 (refer to wirings indicated by one dot chain line in FIGS. 7A and 7B).

In this case, the difference between the MSB of the latch circuit 25 and the MSB of the subtracter 21 is 12 bits, and therefore so as to divide the accumulation data $D_3$ consisting of X bits by (N×K) and obtain 8 bits of output data $D_O$ having the same number of bits as the input data $D_i$, the accumulation data $D_3$ output from the latch circuit 25 must be always 20 bits and N×K must be always a numeral of 12 bits worth.

This is carried out by setting the multiplier K by the multiplying setting part 32 in accordance with the moving average length N, which is arbitrarily modified.

For example, when assuming that the moving average length N is 128 (7 bits worth), the multiplier K is set to $2^5$ (5 bits worth).

In this case, the subtraction data $D_1$ output from the subtracter 21 becomes 8 bits, and this 8 bits of data $D_1$ is multiplied by $2^5$ at the multiplier unit 31, whereby it is output as the multiplied data $D_4$ consisting of 13 bits. Here, when assuming that the selector 33 has selected the accumulation data $D_3$, 13 bits of the accumulation data $D_4$ is accumulated at the accumulator unit 22 having the moving average length of 7 bits worth, whereby it is output as the 20 bits of accumulation data $D_3$.

This 20 bits of the accumulation data $D_3$ is shifted by 12 bits in the downward direction and input to the subtracter 21 and, at the same time, output as the output data $D_0$. That is, the output data $D_0$ becomes the 8 bits of data.

Here, where the moving average length N should be modified to 256 (8 bits worth), the multiplier K may be modified to $2^4$.

In this case, since the subtraction data $D_I$ has 8 bits similar to the above description, the 8 bits of data $D_1$ is multiplied by $2^4$ at the multiplier unit 31, whereby it is output as the 12 bits of multiplied data $D_4$, and this 12 bits of multiplied data $D_4$ is accumulated at the accumulator unit 22 having a moving average length of 8 bits worth, whereby this is output as the 20 bits of accumulation data $D_3$, and further this 20 bits of accumulation data $D_{13}$ is shifted by 12 bits in the downward direction and input to the subtracter unit 21 and, at the same time, output as the output data $D_0$. That is, the output data $D_0$ becomes 8 bits data.

Below, by similarly setting the multiplier K in accordance with the moving average length N, it is possible to always output the input data $D_i$ as the output data $D_0$.

Here, when the number of bits of the input data $D_i$ is represented by $2^D$, the accumulation data $D_3$ becomes the number of bits obtained by converting $2^D \times 2^m \times 2^n$ into terms of bit. Namely, when the number of bits of the accumulation data $D_3$ is represented by $2^P$, it becomes $2^P = 2^D \times 2^m \times 2^n$.

As mentioned above, where the input data $D_i$ consists of 8 bits and the accumulator unit 22 has 20 bits, the accumulation data $D_3$ must always have 20 bits, and therefore $2^{20}$ becomes equal to $2^8 \times 2^m \times 2^n$.

As the value which can make the moving average length N variable in this case, $2^{12}$ obtained by dividing $2^{20}$ of the accumulation data $D_3$ by 8 bits ($2^8$) of the output data $D_0$ becomes the maximum value, and it can be changed up to $2^0$ by each one bit worth in the downward direction below.

Where the moving average length N is $2^{12}$, $2^{20}$ becomes equal to $2^8 \times 2^m \times 2^{12}$, and therefore the multiplier K ($2^m$) may be set to $2^0$; where the moving average length N is $2^{11}$, $2^{20}$ becomes equal to $2^8 \times 2^m \times 2^{11}$, and therefore the multiplier K may be set to $2^1$; where the moving average length N is $2^{10}$, $2^{20}$ becomes equal to $2^8 \times 2^m \times 2^{10}$, and therefore the multiplier K may be set to $2^2$; . . . ; and where the moving average length N is $2^0$, $2^{20}$ becomes equal to $2^8 \times 2^m \times 2^0$, and therefore the multiplier K may be set to $2^{12}$.

As another example, where the input data $D_i$ consists of 8 bits and the accumulator unit 22 has 25 bits, the accumulation data $D_3$ must always have 25 bits, and therefore as the value which can make the moving average length N variable in this case, $2^{17}$ obtained by dividing $2^{25}$ of the accumulation data $D_3$ by $2^8$ of the output data $D_0$ becomes the maximum value, and it can be made variable up to $2^0$ by each one bit worth in the downward direction below.

Where the moving average length N is $2^{17}$, $2^{25}$ becomes equal to $2^8 \times 2^m \times 2^{17}$, and therefore the multiplier K ($2^m$) may be set to $2^0$; where the moving average length N is $2^{16}$, $2^{25}$ becomes equal to $2^8 \times 2^m \times 2^{16}$, and therefore the multiplier K may be set to $2^1$; where the moving average length N is $2^{15}$, $2^{25}$ becomes equal to $2^8 \times 2^m \times 2^{15}$, and therefore the multiplier K may be set to $2^2$; . . . ; and where the moving average length N is $2^0$, $2^{25}$ becomes equal to $2^8 \times 2^m \times 2^0$, and therefore the multiplier K may be set to $2^{17}$.

As explained above, in the quasi-moving average circuit shown in FIG. 9, where the moving average length N is changed, it is not necessary to modify the connection configuration of wirings between the latch circuit 25 and the subtracter 21 as shown in FIGS. 7A and 7B, and therefore the changing of the moving average length N can be easily carried out.

Also, the value to be fed back to the adder 24 can be arbitrarily set by the initial value setting part 34, and therefore in the initial state such as the turning on of the power source, etc., a time to when the output data $D_O$ becomes the stable value can be shortened.

In this, where for example the input data $D_i$ is "1", desirably "1" is to be obtained as the output data $D_0$, but where the value fed back from the latch circuit 25 to the adder 24 is "1", it must be added to the adder 24 by the accumulation operation. However, when the constitution is made so that "0" is set as the initial value $D_5$ by the initial value setting part 34 and this is selected at the selector 33 and output to the adder 24, "1" can be obtained faster than the case of "−1". The initial value $D_5$ may be set with reference to the last used value of that system.

In conclusion, for the requirement that the time to when the output data $D_0$ becomes the stable value is desirably to be shortened, as set forth in claim 2, a selector 33 is provided on the addition input side receiving the aforesaid accumulation data at the aforesaid adder 24, and the selector 33 selects either one of the accumulation data or the preliminarily determined initial value and applies the same to the aforesaid addition input side. In this case, in a system in which the aforesaid quasi-moving average circuit is incorporated, where this quasi-moving average circuit is restarted, the aforesaid accumulation data output from the aforesaid accumulator unit 22 just before that restarting is held, and this held accumulation data is defined as the aforesaid preliminarily determined initial value.

A fact that the time to when the output data $D_0$ becomes the stable value is desirably to be shortened will be explained with concrete numerals with reference to the following Table 1 and Table 2. Note that, A, B, C, and D indicated in the top columns of Tables 1 and 2 represent the data appearing at the parts labeled with A, B, C, and D in FIG. 9. Also, t is an elapsed time.

TABLE 1

| t | A | B | C | D |
|---|---|---|---|---|
| 0 |   |   | 0 | 0 |
| 1 | 1.5 | 0 |   | 1.5 | 0.15 |
| 2 | 0.5 | −0.15 | 1.5 + 0.5 − 0.15 = 1.85 | 0.19 |
| 3 | 1.5 | −0.19 | 1.85 + 1.5 − 0.19 = 3.16 | 0.32 |
| 4 | 0.5 | −0.32 | 3.16 + 0.5 − 0.32 = 3.34 | 0.33 |
| 5 | 1.5 | −0.33 | 3.34 + 1.5 − 0.33 = 4.51 | 0.45 |
| 6 | 1.5 | −0.45 | : = 4.56 | 0.46 |
| 7 | 1.5 | −0.46 | : = 5.6 | 0.56 |
| 8 | 0.5 | −0.56 | : = 5.54 | 0.55 |

TABLE 1-continued

| t | A | B | C | D |
|---|---|---|---|---|
| 9 | 1.5 | −0.55 | = 6.49 | 0.65 |
| 10 | 0.5 | −0.65 | = 6.34 | 0.63 |
| 11 | 1.5 | −0.63 | = 7.21 | 0.72 |
| 12 | 0.5 | −0.72 | = 6.99 | 0.70 |
| 13 | 1.5 | −0.70 | = 7.79 | 0.78 |
| 14 | 0.5 | −0.78 | = 7.71 | 0.77 |
| 15 | 1.5 | −0.77 | = 8.44 | 0.84 |
| 16 | 0.5 | −0.84 | = 8.10 | 0.81 |
| 17 | 1.5 | −0.81 | = 8.79 | 0.88 |
| 18 | 0.5 | −0.88 | = 8.41 | 0.84 |
| 19 | 1.5 | −0.84 | = 9.07 | 0.91 |
| 20 | 0.5 | −0.91 | = 8.66 | 0.87 |
| 21 | 1.5 | −0.87 | = 9.29 | 0.93 |
| 22 | 0.5 | −0.93 | = 8.86 | 0.89 |
| 23 | 1.5 | −0.89 | = 9.47 | 0.95 |
| 24 | 0.5 | −0.95 | = 9.02 | 0.90 |
| 25 | 1.5 | −0.90 | = 9.62 | 0.96 |
| 26 | 0.5 | −0.96 | = 9.16 | 0.92 |
| : | : | : | : | : |
| : | : | : | : | : |

The input data (column A) is changed to 0.5 or 1.5 by the effect of noise or the like although the actual value is 1. However, the expected value at D will approach 1. Note that, the moving average length at the accumulator unit 22 is set to 10.

Table 2 indicates the change of the data where the initial value 0.5 is given from the initial value setting part 34 of FIG. 9. Note that, in Table 1, the column C when for example t=2 becomes:

$$1.5 + 0.5 - 0.15 = 1.85$$

Among this, 1.5 is the value of the column C when t=1, 0.5 is the value of A when t=2, and −0.15 is the value of B when t=2. It is true also for Table 2.

TABLE 2

| t | A | B | C | D |
|---|---|---|---|---|
| 0 |  | 0.5 |  | 0.5 |
| 1 | 1.5 | −0.50 | 5 + 1.5 − 0.5 = 6 | 0.6 |
| 2 | 0.5 | −0.60 | 6 + 0.5 − 0.6 = 5.9 | 0.59 |
| 3 | 1.5 | −0.59 | 5.9 + 1.5 − 0.59 = 6.81 | 0.68 |
| 4 | 0.5 | −0.68 | 6.81 + 0.5 − 0.68 = 6.63 | 0.66 |
| 5 | 1.5 | −0.66 | = 7.47 | 0.75 |
| 6 | 1.5 | −0.75 | = 7.22 | 0.72 |
| 7 | 1.5 | −0.72 | = 8.0 | 0.80 |
| 8 | 0.5 | −0.80 | = 7.7 | 0.77 |
| 9 | 1.5 | −0.77 | = 8.43 | 0.84 |
| 10 | 0.5 | −0.84 | = 8.09 | 0.81 |
| 11 | 1.5 | −0.81 | = 8.78 | 0.88 |
| 12 | 0.5 | −0.88 | = 8.40 | 0.84 |
| 13 | 1.5 | −0.84 | = 9.06 | 0.91 |
| 14 | 0.5 | −0.91 | = 8.65 | 0.87 |
| 15 | 1.5 | −0.87 | = 9.28 | 0.93 |
| 16 | 0.5 | −0.93 | = 8.85 | 0.89 |
| 17 | 1.5 | −0.89 | = 9.46 | 0.95 |
| 18 | 0.5 | −0.95 | = 9.01 | 0.90 |
| 19 | 1.5 | −0.90 | = 9.61 | 0.96 |
| 20 | 0.5 | −0.96 | = 9.15 | 0.92 |
| 21 | 1.5 | −0.92 | = 9.73 | 0.97 |
| : | : | : | : | : |
| : | : | : | : | : |
| : | : | : | : | : |

As shown in Table 1, under the first embodiment, t=0→19 is required until for example the value of the column D becomes 0.91, which is long. On the other hand, when the initial value $D_5$ of FIG. 9 is given, as shown in Table 2, t=0→13 is required until the value of the column D becomes 0.91. Clearly, in FIG. 9 (second embodiment), a high speed pull-in is attained.

In FIG. 9, the multiplier unit 31 acts as an important part in the second embodiment. So as to realize this multiplier unit 31, a digital multiplier logic circuit can be used.

Figure 10:
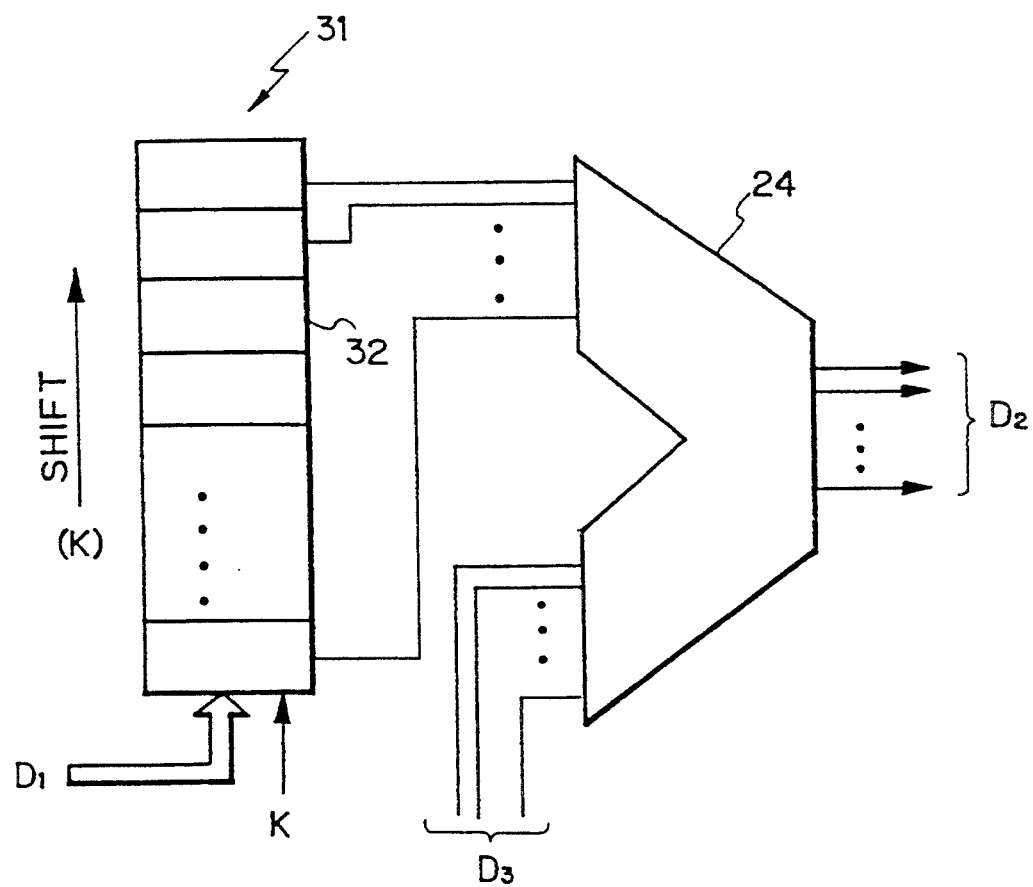
FIG. 10 is a diagram showing one example of a multiplier unit in FIG. 8.

FIG. 10 is a diagram showing one example of the multiplier unit in FIG. 8, and the aforesaid multiplier unit 31 comprises a shift register 32 constituted so as to receive as its input the aforesaid subtraction data $D_1$, shift that input subtraction data by the amount of bits corresponding to the aforesaid multiplier K, and input the subtraction data after shifting to the predetermined bits on the aforesaid subtraction data input side in the aforesaid adder 24.

As explained above, according to the quasi-moving average circuit according to the present invention, the constitution is made so that 1/N of the value after the accumulation, that is, the average value of the N sampled values up to the preceding sampling, is used and subtracted from the input data without use of a signal obtained by delaying the input data by the amount of N samplings, whereby an approximating moving average value is generated, and therefore it becomes unnecessary to use the shift register, a circuit reduced in size can be realized, and underflow or overflow of the accumulator unit can be prevented.

Also, the modification of the moving average length N is extremely easy.

We claim:

1. A quasi-moving average circuit comprising:
   a subtracter having two inputs, said subtracter receiving input data to be averaged at one of said two input and outputting subtraction data;
   an accumulator unit which adds the subtraction data from said subtracter to accumulation data obtained by accumulation of an amount of a predetermined number N of samplings up to a preceding sampling; and
   division means which divides the accumulation data from said accumulator unit by N, thereby outputting an average value of the N sampled values as the output data at a present sampling time while applying the output data at a preceding sampling time at the other of said two inputs of said subtracter such that said subtracter subtracts the output data at the preceding sampling time from said input data at the present sampling time to output said subtraction data.

2. A quasi-moving average circuit as in claim 1, wherein said accumulator unit comprises:
   an adder which adds said subtraction data and said accumulation data;
   latch circuits which delay the output data from said adder by the amount of one sampling.

3. A quasi-moving average circuit as in claim 2, wherein said division means is constituted by extracting only output lines corresponding to a plurality of upper bits among output lines of said latch circuits and connecting said extracted output lines to a subtraction input side of said subtracter in correspondence with respective bits from the upper bit to the lower bit of said subtracter.

4. A quasi-moving average circuit as in claim 2, wherein a multiplier unit which multiplies said subtraction data by a predetermined multiplier K, K being an integer of 2 or more, is inserted between said subtracter and a subtraction data input unit of said accumulator unit; and said division means is constituted by extracting only output lines corresponding to a plurality of upper bits among output lines of said latch circuits and connecting said extracted output lines in correspondence with respective bits from the upper bit to the lower bit on a subtraction input side of said subtracter, said division means dividing the accumulation data of said accumulator unit by $N \times K$ $(1/(N \times K))$, and outputting an average value of the N sampled values as the output data at the present sampling time.

5. A quasi-moving average circuit as in claim 4, wherein N is made variable; and the value of said multiplier K is set corresponding to said variable N.

6. A quasi-moving average circuit as in claim 5, wherein the value of said multiplier K is set in correspondence with said variable N so as to satisfy $2^D \times 2^m \times 2^n - 2^P$ when the number of bits of said input data is represented by a binary number $2^D$ (D=1, 2, ...);
    said multiplier K being represented by a binary number $2^m$ (m=1, 2, ...); and
    said number N of samplings being represented by $2^n$ (n=1, 2, ...).

7. A quasi-moving average circuit as in claim 4, wherein said multiplier unit includes a digital multiplier logic circuit.

8. A quasi-moving average circuit as in claim 4, wherein said multiplier unit includes a shift register receiving at an input thereto said subtraction data, and shifting said input subtraction data by an amount of bits corresponding to said multiplier K, and inputting the subtraction data after said shift to said adder.

9. A quasi-moving average circuit as in claim 2, wherein a selector is further on an input side of said adder incorporated for receiving said accumulation data, and said selector selects either one of said accumulation data and a preliminary determined initial value applied to said selector from an initial value setting means, and applies the selected one to said adder input side.

10. A quasi-moving average circuit as in claim 9, wherein in a system in which said quasi-moving average circuit is incorporated and is restarted, said accumulation data output by said accumulator unit just before said restarting is held, said held accumulation data being defined as said preliminarily determined initial value.

* * * * *